United States Patent
Mueller et al.

(10) Patent No.: US 6,945,498 B2
(45) Date of Patent: Sep. 20, 2005

(54) COMMERCIAL EXPERIMENT SYSTEM IN ORBIT

(75) Inventors: George E. Mueller, Kirkland, WA (US); Gary Lai, Seattle, WA (US); Thomas C. Taylor, Las Cruces, NM (US)

(73) Assignee: Kistler Aerospace Corporation, Kirkland, WA (US)

( * ) Notice: Subject to any disclaimer, the term of this patent is extended or adjusted under 35 U.S.C. 154(b) by 0 days.

(21) Appl. No.: 10/682,761

(22) Filed: Oct. 9, 2003

(65) Prior Publication Data

US 2004/0188562 A1 Sep. 30, 2004

Related U.S. Application Data

(60) Provisional application No. 60/418,868, filed on Oct. 15, 2002.

(51) Int. Cl.[7] .................................................. B64G 1/00
(52) U.S. Cl. .................................... 244/158 R; 244/172
(58) Field of Search ............................. 244/158 R, 172

(56) References Cited

U.S. PATENT DOCUMENTS

| | | | |
|---|---|---|---|
| 4,789,118 A | | 12/1988 | Byers |
| 5,020,743 A | | 6/1991 | von Bun |
| 5,228,644 A | | 7/1993 | Garriott |
| 5,243,544 A | * | 9/1993 | Schoess ..................... 702/141 |
| 5,628,476 A | | 5/1997 | Soranno |
| 5,755,406 A | | 5/1998 | Aston |
| 5,806,799 A | | 9/1998 | Lounge |
| 5,848,766 A | | 12/1998 | Thompson |
| 5,931,418 A | * | 8/1999 | Eller et al. ............... 244/158 A |
| 5,961,076 A | * | 10/1999 | Eller et al. ............... 244/158 R |
| 6,175,783 B1 | * | 1/2001 | Strength et al. .............. 701/13 |
| 6,206,327 B1 | * | 3/2001 | Benedetti et al. ....... 244/158 R |
| 6,283,416 B1 | * | 9/2001 | Fleeter et al. ............... 244/176 |
| 6,792,212 B1 | * | 9/2004 | Lloyd et al. ................ 398/124 |
| 2004/0016393 A1 | * | 1/2004 | Carter ......................... 117/68 |
| 2004/0016852 A1 | * | 1/2004 | Blackwell-Thompson et al. .......................... 244/158 |

OTHER PUBLICATIONS

Long Duration Exposure Facility, website at http://setas–www.larc.nasa.gov/LDEF/, site last updated on Apr. 4, 2001.*

* cited by examiner

*Primary Examiner*—J. Woodrow Eldred
(74) *Attorney, Agent, or Firm*—Michael J. Donohue; Davis Wright Tremaine LLP

(57) ABSTRACT

An orbital experiment system with different internal experiment locations within a reusable launch vehicle making daylong delivery trips to space. The experiments get access to the attributes of low earth orbit, the reusable launch vehicle's power and other subsystems. The experimenter utilizes uniform experiment trays having a uniform connector for connection to an experiment management unit mounted on the orbital vehicle. The experiment management unit provides power and data from the orbital vehicle related to the operation of the orbital vehicle and permits an experiment check simulation prior to integration into the launch vehicle. The uniform size and connectivity requirements provide low cost options for the delivery of an experiment into space and the return of the experiment from space. A commercial transportation system to and from orbit delivers a primary payload and provides a 24-hour return cycle for the internal secondary experiments, which provide a quick confirmation of technical experiment exposure to space and quick re-flight opportunities.

42 Claims, 8 Drawing Sheets

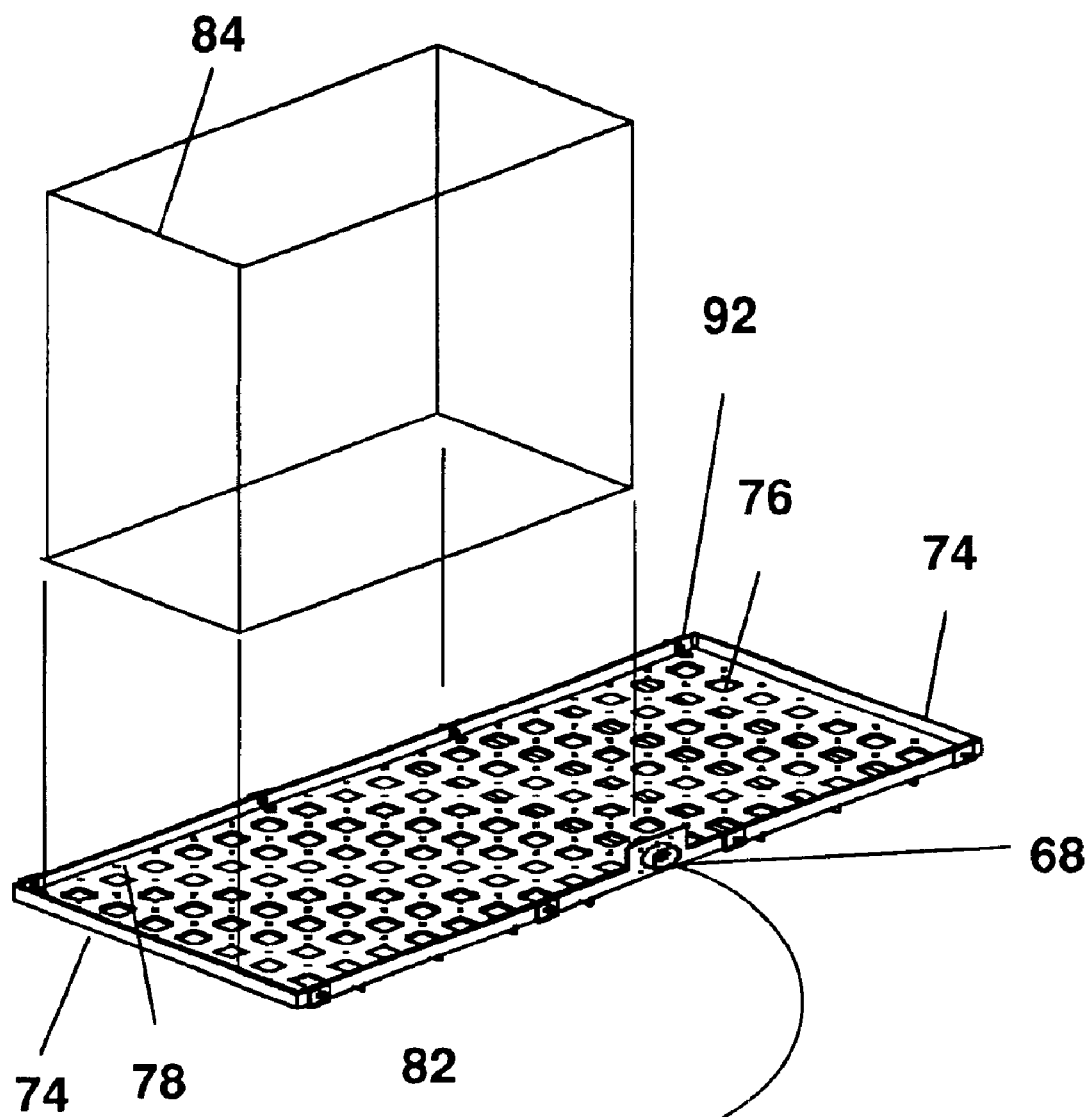
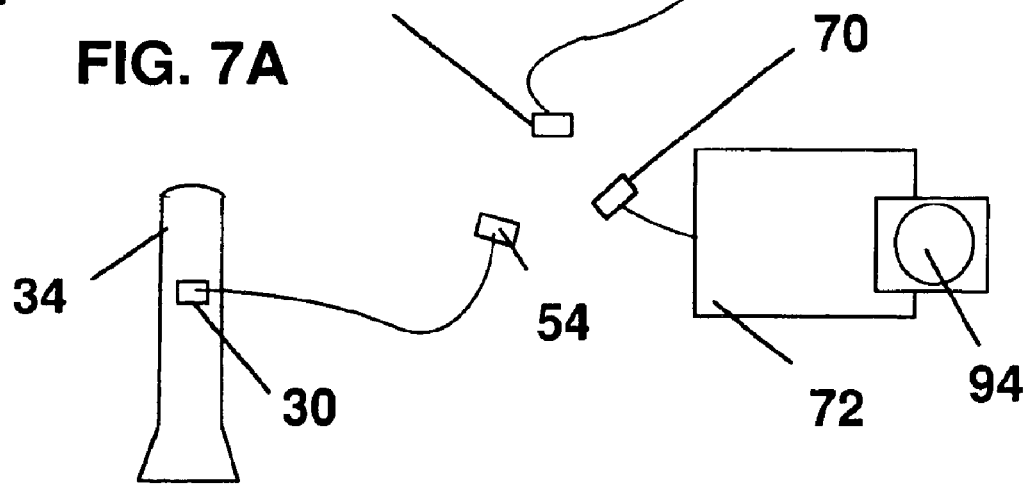
FIG. 7A
FIG. 7B
FIG. 7C

COMMERCIAL EXPERIMENT SYSTEM IN ORBIT

CROSS-REFERENCE TO RELATED APPLICATIONS

This utility patent application claims the benefit of the filing of U.S. Provisional Patent Application No. 60/418,868, entitled "Commercial Experiment System in Orbit," filed on Oct. 15, 2002 and the specification thereof is incorporated herein by reference.

This utility patent application also claims the benefit of the filing of U.S. Disclosure Document No. 521688, entitled "Commercial External Re-entry Testing from Orbit (IDF039) and Secondary Internal payloads (IDF063)," filed on Nov. 15, 2002 and the specification thereof is incorporated herein by reference.

This utility patent application also claims the benefit of the filing of U.S. Disclosure Document No. 443743, entitled "Secondary Payloads (IDF03)," filed on Aug. 24, 1998 and the specification thereof is incorporated herein by reference.

STATEMENT REGARDING FEDERALLY SPONSORED RESEARCH OR DEVELOPMENT

No government funding, no government support or government contract or clause is related to this invention.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to transporting secondary experiments to and from orbit inside a reusable launch vehicle. More particularly, the present invention relates generally to the access to space attributes hardware innovation with supporting repeatable transportation, transfer and attachment of payloads to a variety of space transportation vehicles for the research, testing and the production of products in microgravity including the return of products to earth for profit.

2. Description of the Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The transportation of cargo to space is expensive. The secondary payload hardware has mass and minimum volume. Transporting the internal secondary payload hardware to and from orbit in an affordable manner is a goal consistent with life cycle costs and efficient logistics operations. The problem is the cost of the individual operations required to transport cargo to orbit. The part of the transportation operation can be addressed by the emerging reusable launch vehicles. Kistler Aerospace's secondary payload hardware research and development has proposed various additional aerospace structures and opened a new area of technology and commercial secondary payload hardware accommodation. Secondary payload hardware structures are a refined technology within the aerospace community. Unmanned activities in space are less expensive than manned activities. The unmanned aerospace reusable launch vehicle (RLV) can provide the secondary payload hardware technologies to smooth this process.

The traditional approach to manifesting of space launch systems has been hardware intensive, safety driven and long duration scheduling activities. The emerging commercial technologies point another way and attempt to be sensitive to commercial customer's launch on demand requirements.

The present invention uses the emerging technologies to create hardware and procedures of a commercial nature. These secondary payload hardware systems start the process of lowering the cost of space activities by creating a commercial system using space for commercial gain and supported by affordable transportation.

Accordingly, it can be appreciated that there is a great need for a cost effective, reliable, efficient, and safe hardware systems using integrated technologies containing subsystems common with the reduced cost hardware solutions. The present invention provides this and other advantages, as will be apparent from the following detailed description and accompanying figures.

BRIEF SUMMARY OF THE INVENTION

The present invention is directed to techniques for introducing payloads into earth orbit. In an exemplary embodiment, a system for introducing payloads into earth orbit comprises an orbital vehicle capable of being placed in earth orbit with the orbital vehicle having a rounded outer skin to define an interior portion. A vehicle monitor system is included to provide data related to the operation of the orbital vehicle. The system further comprises a plurality of attachment positions located within the interior portion of the orbital vehicle and a first experimental container affixed to the orbital vehicle at a first one of the plurality of attachment positions with the first experimental container being electrically coupled to the vehicle monitor system to receive data therefrom with the data being used by experimental devices contained within the first experimental container.

In an exemplary embodiment, the system further comprises a second experimental container affixed to the orbital vehicle at a second one of the plurality of attachment positions with the second experimental container being electrically coupled to the vehicle monitor system to receive control data therefrom with the control data being used by experimental devices contained within the second experimental container.

In one embodiment, the first and second experimental containers have uniform predetermined dimensions with the first and second ones of the plurality of attachment positions being configured to receive and retain the first experimental containers. In one embodiment, the orbital vehicle has the elongated shape with first and second ends with a rocket engine positioned proximate to the second end of the orbital vehicle. In this embodiment, the first of the plurality of attachment positions is located within the interior portion of the orbital vehicle proximate the first end. The experimental containers positioned at the interior portion proximate the first end may be positioned within the interior portion of the orbital vehicle and shielded from a space environment. In an alternative embodiment, an attachment positioned may be in the interior portion of the orbital vehicle intermediate the first and second ends. In this embodiment, experimental containers attached in the interior portion of the orbital vehicle intermediate the first and second ends is shielded from a space environment.

In yet another alternative embodiment, the first of the plurality of attachment positions may be in the interior portion of the orbital vehicle proximate the second end. In this embodiment, experimental containers attached to the interior portion of the orbital vehicle proximate the second end may be exposed to a space environment.

The system may further comprise an experiment management unit electrically coupled to the orbital vehicle and electrically coupled to the first experimental container. The experiment management unit monitors operation of the orbital vehicle and provides the vehicle monitor system data to the first experimental container. In one embodiment, the experiment management unit may provide electrical power to the first experimental container. In yet another alternative embodiment, the first experimental container may comprise a plurality of experimental trays. Each of the experimental trays may be coupled to the experiment management unit. In yet another alternative embodiment, each of the experimental trays may be coupled to the experiment management unit and derive electrical power therefrom.

In yet another exemplary embodiment, the system further comprises an experiment management unit simulator which is configured for operation with program instructions to simulate operation of the orbital vehicle during a mission. In one embodiment, the experiment management unit simulator is configured for operation at a location remote from the orbital vehicle and requires no interaction with the orbital vehicle.

BRIEF DESCRIPTION OF THE SEVERAL VIEWS OF THE DRAWING(S)

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 7A–7C illustrate the experiment tray.

DETAILED DESCRIPTION OF THE INVENTION

Figure 1:
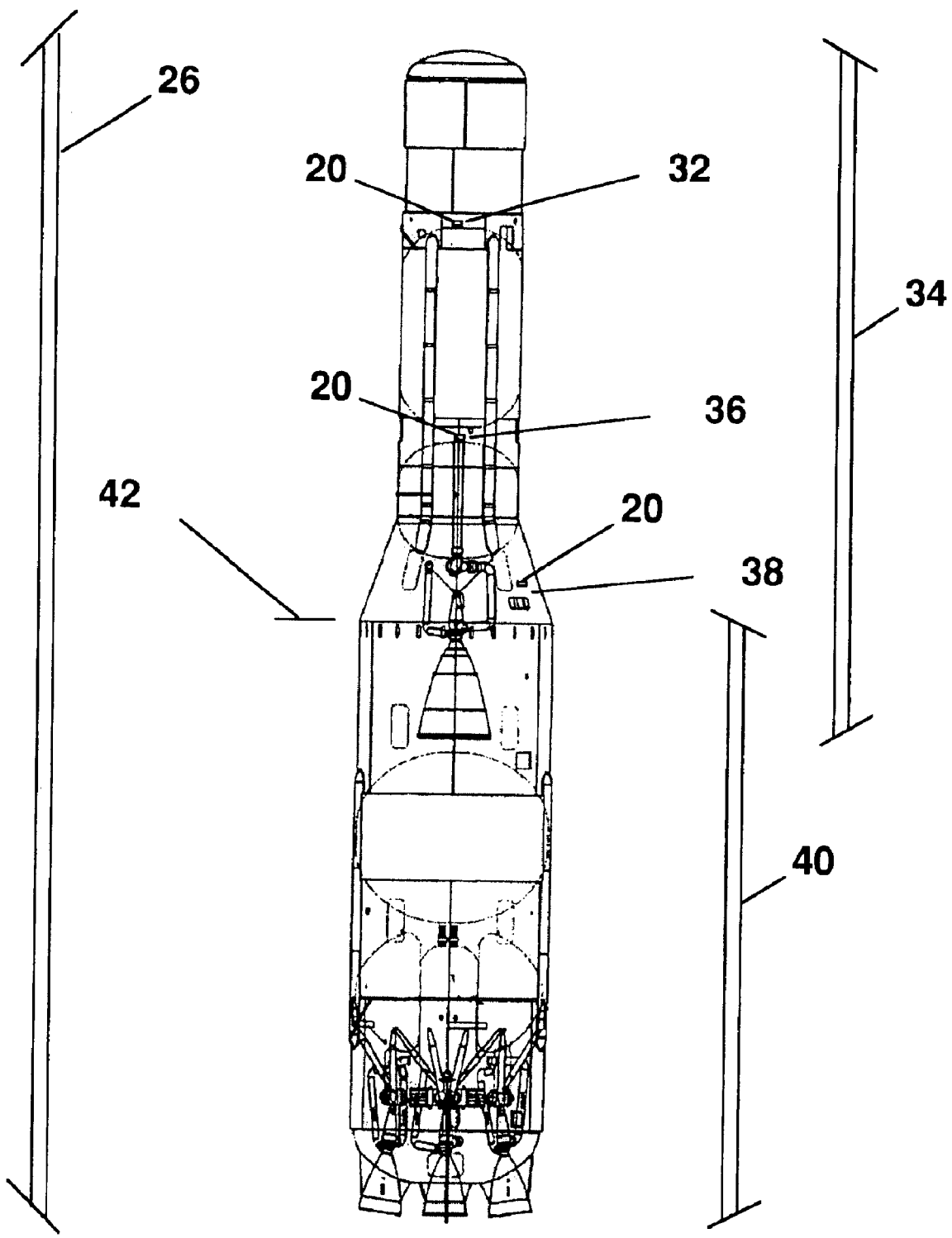
FIG. 1 illustrates the RLV with secondary payload hardware system locations.

The present invention includes the sale, integration, transport to orbit, exposure in orbit and return of various internal support hardware and experiments as a service within the Kistler Aerospace Reusable Launch Vehicle (RLV) and other transportation vehicles. The hardware uses emerging technologies of commercial accommodation on a fully reusable launch vehicle, which is unmanned and two stage to accommodate these "Secondary Payloads" on aerospace vehicles. The hardware is capable of providing more services, when carried in orbit, including power, communications and different structural attachments.

The secondary payload hardware relates to enhancing existing customer interfaces and support structure technologies, reusable launch vehicle (RLV) technology and its use in the space environment of orbit. The present invention provides a more cost-effective integration, transportation cycle, 22-hour exposure in orbit and return. The customer system is capable of placing payloads into orbits beyond the capability of sounding rockets, and other current methods.

In accordance with the secondary payload hardware method of providing support for the experiment tray and other experiment accommodation hardware and eventually integrating/delivering/servicing experiment payloads to low earth orbit in a cost effective manner, the hardware of the invention uses the RLV in support of a series of secondary payload hardware solutions creating a commercial service enterprise in microgravity for payload accommodation.

The flexible accommodation of secondary payload hardware on the launch vehicles using various methods provides a commercial service to the customer. To achieve commercial success, cost reduction is necessary. A primary advantage of the present invention is reduced cost due to the effective combination of the RLV transportation, reduced subsystem and support hardware, a service of a commercial nature, integration and processing with the vehicle's refurbishment between flights, the use of the transport vehicle's avionics, power, communications and other capabilities and applying other technologies to reduce costs.

The advantage of the secondary payload hardware on the RLV provides an opportunity for commonality with subsystems used on the launch vehicle and/or secondary payload hardware providing cost effective common subsystems through commonality in design, procurement, testing and secondary payload hardware attachment.

A typical mission timeline includes the 22 hours of benign exposure to space attributes in orbit. Experiments are delivered into earth orbit and returned to earth following the completion of the mission.

Another cost saving attribute of the present approach to secondary payload design is the common ground handling techniques, technical maintenance, financing and ownership of the secondary payload hardware, launch vehicle, and payloads. The systems described herein utilize an integrated design, flexible enough to be capable of accommodating on a general platform, a number of different payloads from numerous organizations with varying requirements, different weights, different processing requirements, and varying financial needs.

The use of the K-1 orbiter or other launch vehicle, which provides its vehicle capabilities in orbit and services the secondary payload hardware payloads in orbit, greatly reduces the cost of experimental design and operation.

The secondary payload hardware is placed into different orbits than the host launch vehicle. This second stage of the RLV is cost effective, because it combines the advantages of a reusable launch vehicle with the flexibility, common subsystems, multiple attachment locations and launch on demand capabilities of the secondary payload hardware RLV combination.

In a nominal mission, the secondary payload hardware is mated with the customer's experiment. The launch vehicle powers the payloads after it reaches orbit at the orbital inclination. The RLV initiates a series of reboosts, if necessary, to place the primary customer into their desired final orbit.

FIG. 1 depicts a space launch vehicle 26. The space launch vehicle 26 is used for transportation to and from orbit and comprises of an orbital vehicle (OV) stage 34 and Launch Assist Platform (LAP) stage 40 joined at a separation plane 42. The LAP 40 is the first or initial stage that boosts the space launch vehicle 26 from the ground to a predetermined height, when staging occurs. After staging, or the separation of the OV 34 from the LAP 40 at the separation plane 42, the rocket engine in the OV 34 ignites to carry the OV into orbit. As will be discussed in greater detail below, the OV stage 34 includes a number of locations at which an Experimental Containment Box (ECOBOX) 20 may be located. Three locations include an OV forward skirt mounting location 32, an OV mid body mounting location 36 and an OV Aft Flare mounting location 38.

Figures 2A, 2B:
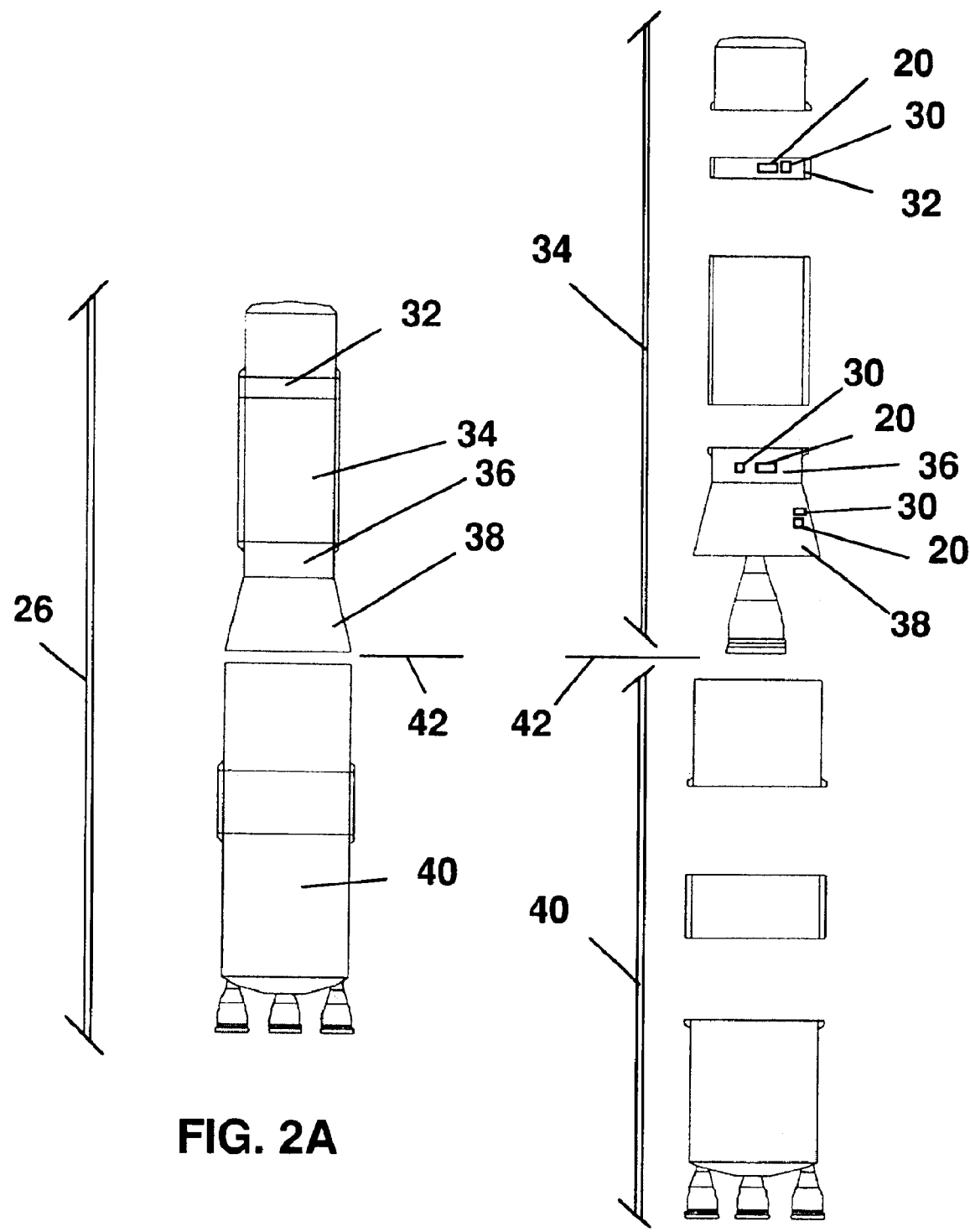
FIGS. 2A–2B illustrate the launch vehicle locations for the secondary payload hardware.

FIG. 2A depicts the typical space launch vehicle 26 with the OV stage 34 mounted over Launch Assist Platform (LAP) stage 40. The OV stage 34 has three locations for ECOBOX 20 with EMU 30, which include an OV forward skirt mounting location 32, an OV mid body mounting location 36 and an OV Aft Flare mounting location 38. These locations are carried to orbit by space launch vehicle 26 after OV stage 34 separates from Launch Assist Platform (LAP) stage of vehicle 40.

In a typical space vehicle, all on-board experiments are completely self-contained. That is, the experiments are not connected to the space vehicle and do not derive any power, control or data from the space vehicle. For example, experiments carried on-board the shuttle are in self-contained sealed experimental lockers that are completely sealed and self-contained. The experimental lockers are not coupled to the shuttle computers or guidance and control systems. Indeed, most experiments are designed to be completely automated and require no activity by the shuttle crew. In some cases, where exposure to the environment of space is desired, the experimental locker is stored in the shuttle cargo bay where the shuttle crew opens the sealed container to expose the interior of the locker to the environment of space.

In contrast, FIG. 2B, space vehicle 26 contains one or more ECOBOX 20 in various locations in OV stage 34. Each ECOBOX 20 with EMU 30 can be connected to the avionics, controls and the other components of space launch vehicle 26 and permits the secondary payload hardware ECOBOX 20 to use the OV stage 34 capabilities. Secondary payload hardware ECOBOX 20 can be used on vehicles other than K-1 space launch vehicle 26.

An ECOBOX 20 located near OV forward skirt mounting location 32 is in OV stage 34. The OV mid body mounting location 36 is also a location for ECOBOX 20, but both are inside the OV stage 34. However, the ECOBOX 20 can also located within OV Aft Flare mounting location 38 and, after separation from the LAP 40 at the separation plane 42, has access to the attributes of space by being open and looking out of the OV Aft Flare volume.

The OV stage 34 remains in orbit for approximately 22 hours and experiences microgravity and the other attributes of orbit as the earth turns under OV stage 34. As the earth is positioned correctly under OV stage 34, the stage re-enters the earth's atmosphere and lands near the original launch site. The ECOBOX 20 is removed and experiments are returned to the customer. Thus, the space vehicle 26 has the capability of inserting experiments into orbit and returning the experiments to earth upon completion of the orbital mission. While remote telemetry can also be used to deliver data to the experimenter, there are many experiments that require the return of the experimental package for analysis. The space vehicle 26 advantageously offers this capability at a much lower cost and with shorter preparation cycles than current technology.

Figure 3:
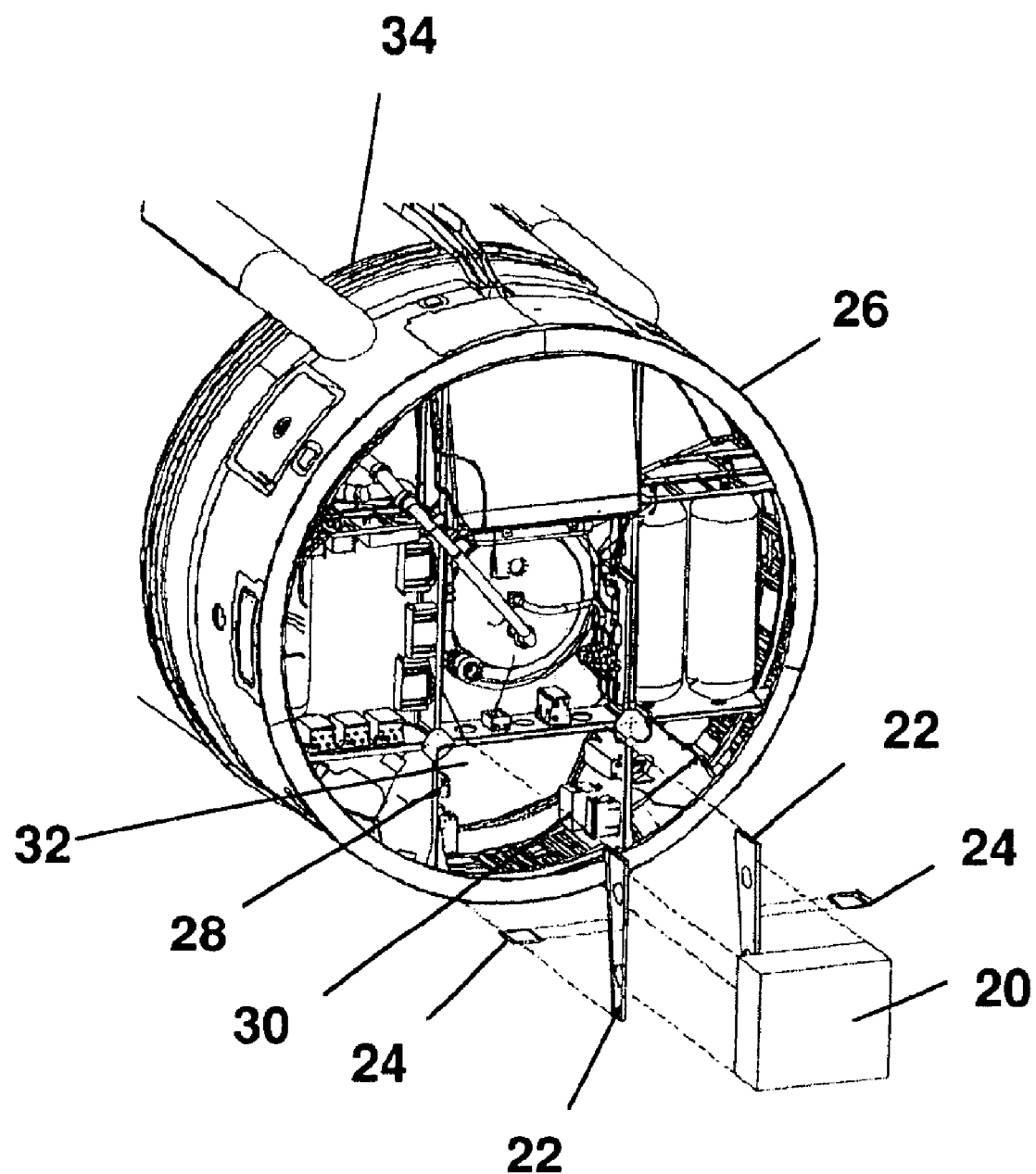
FIG. 3 illustrates secondary payload hardware installed in a forward location inside the RLV.

Reference is now made to FIG. 3, which illustrates a one embodiment of the invention. FIG. 3 is an isometric end view of secondary payload hardware location of ECOBOX 20 in space launch vehicle 26. ECOBOX 20 is structurally attached to launch vehicle interior structure 28 at OV forward skirt mounting location 32.

The ECOBOX 20 is transported to and from orbit in space launch vehicle 26. The space launch vehicle 26 consists of two separate stages, (i.e., the LAP stage 40 and the OV stage 34). The ECOBOX 20 is attached to OV stage 34 as opposed to the LAP stage 40 (see FIGS. 1, 2A and 2B). The ECOBOX 20 is attached at to OV forward skirt mounting location 32 in the OV stage 34 of the space launch vehicle 26 by an experiment support structure 22 and a small bracket 24 with shock mountings.

An Experiment Management Unit (EMV) 30 is attached to the launch vehicle interior structure 28, electrically connected to the ECOBOX 20 and to the capabilities of the OV stage 34 to permit the ECOBOX 20 to use the power, data recording, control, power conditioning, 1553B bus and transport capabilities of the OV stage. The 1553B bus refers to a MIL-STD-1553B K-1 avionics bus, which is employed on the OV stage 34. Operation of the 1553B bus is understood by those of ordinary skill in the art and need not be described in greater detail herein. The operation of the EMU 30 can be simulated. EMU simulation is particularly useful for ground simulations during the design and preparation of experimental packages. Details of the operation of the EMU 30 and EMU simulation are provided and illustrated in FIGS. 6–8.

Figure 4:
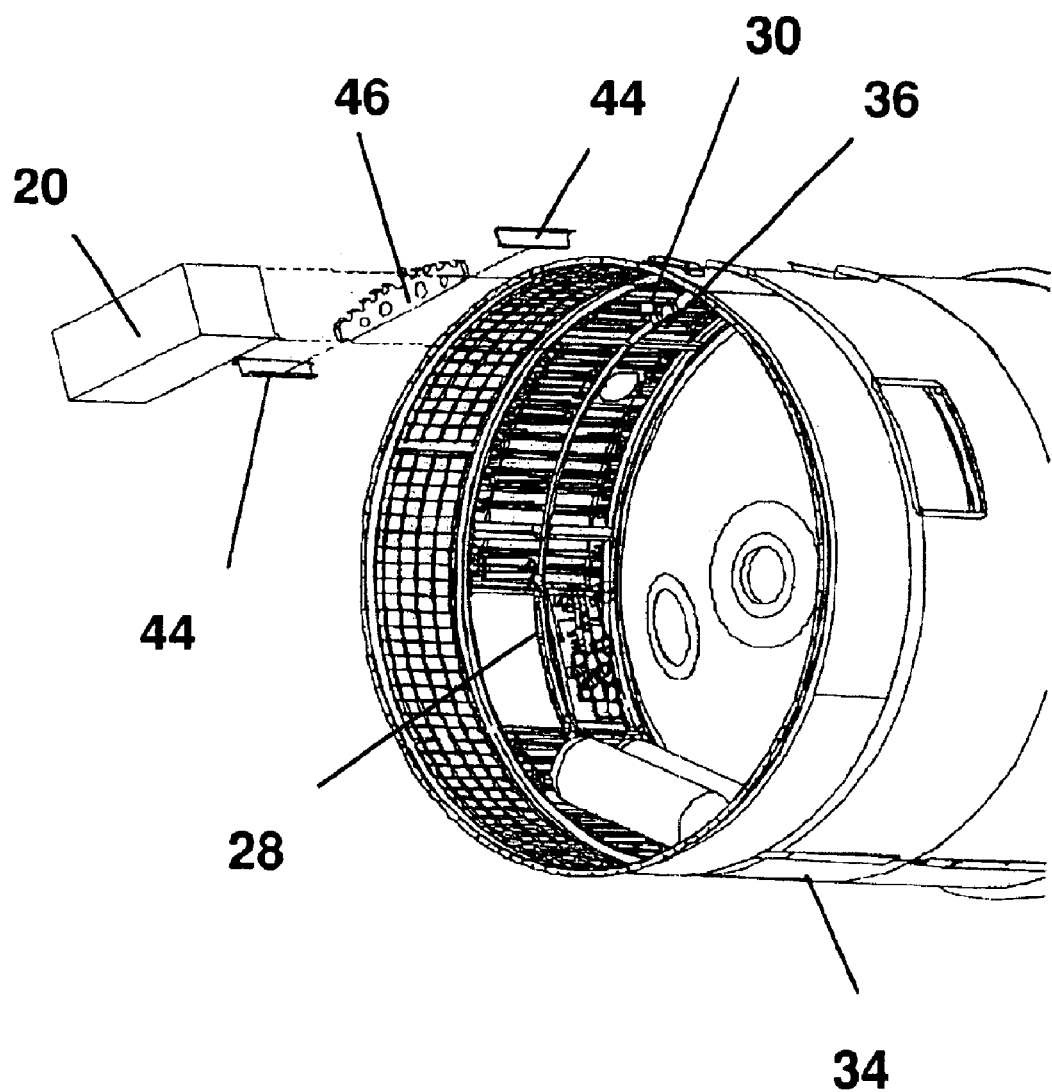
FIG. 4 illustrates the secondary payload hardware installed mid location inside the RLV.

FIG. 4 depicts the ECOBOX 20 with EMU 30 attached to the OV mid body mounting location 36 within the OV stage 34. In orbit, this volume OV mid body mounting location 36 is still contained within OV stage 34. The ECOBOX 20 with EMU 30 located near the OV mid body mounting location 36 is attached to launch vehicle interior structure 28 by means of support brace 44 and curved brace 46.

Figure 5:
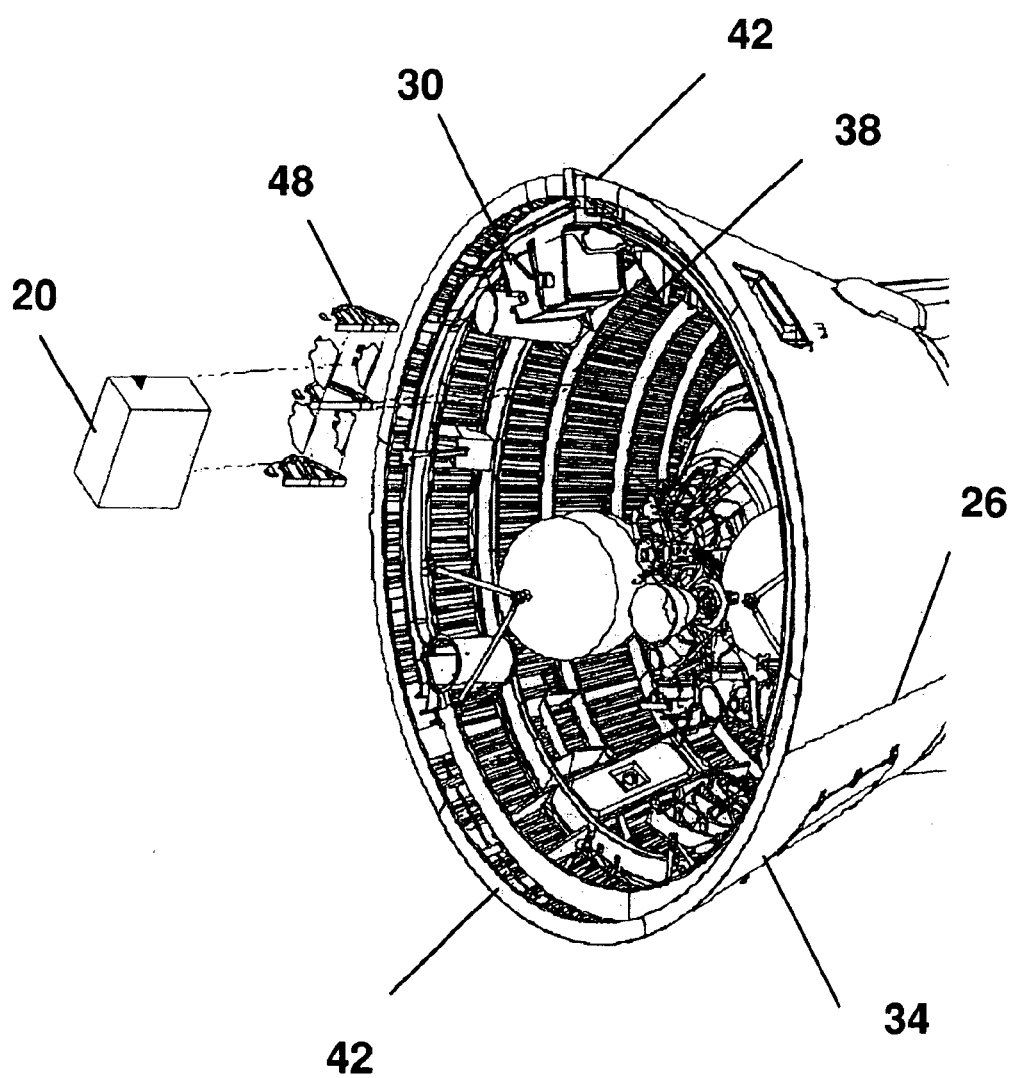
FIG. 5 illustrates the secondary payload hardware installed mid location inside the RLV.

FIG. 5 depicts a third ECOBOX 20 configuration location of secondary payload hardware using the space launch vehicle 26 and OV stage 34 subsystems for a secondary purpose. Just forward of separation plane 42 between the two stages in space vehicle 26 on OV stage 34 side is the OV Aft Flare mounting location 38. The ECOBOX 20 with EMU 30 is attached to space launch vehicle 26 using flare bracing 48.

The OV Aft Flare mounting location 38 is significantly different from the OV forward skirt mounting location 32 (see FIG. 3) and the OV mid body mounting location 36 (FIG. 4) in that the location is exposed to the orbital space environment and the exterior launch environment after separation of the two stages. As the separation process occurs OV Aft Flare mounting location 38 changes from a closed volume to an open volume and the ECOBOX 20 with EMU 30 mounted at this location acquire access to the shielded, but open atmosphere of space at approximately 135,000 feet. The ECOBOX 20 configuration open condition is shielded from the ascent heating and slipstream as OV stage 34 proceeds into low earth orbit and beyond. The ECOBOX 20 configuration open condition is also shielded from the re-entry heating and slipstream as OV stage 34 proceeds from low earth orbit to a landing on earth.

Figure 6:
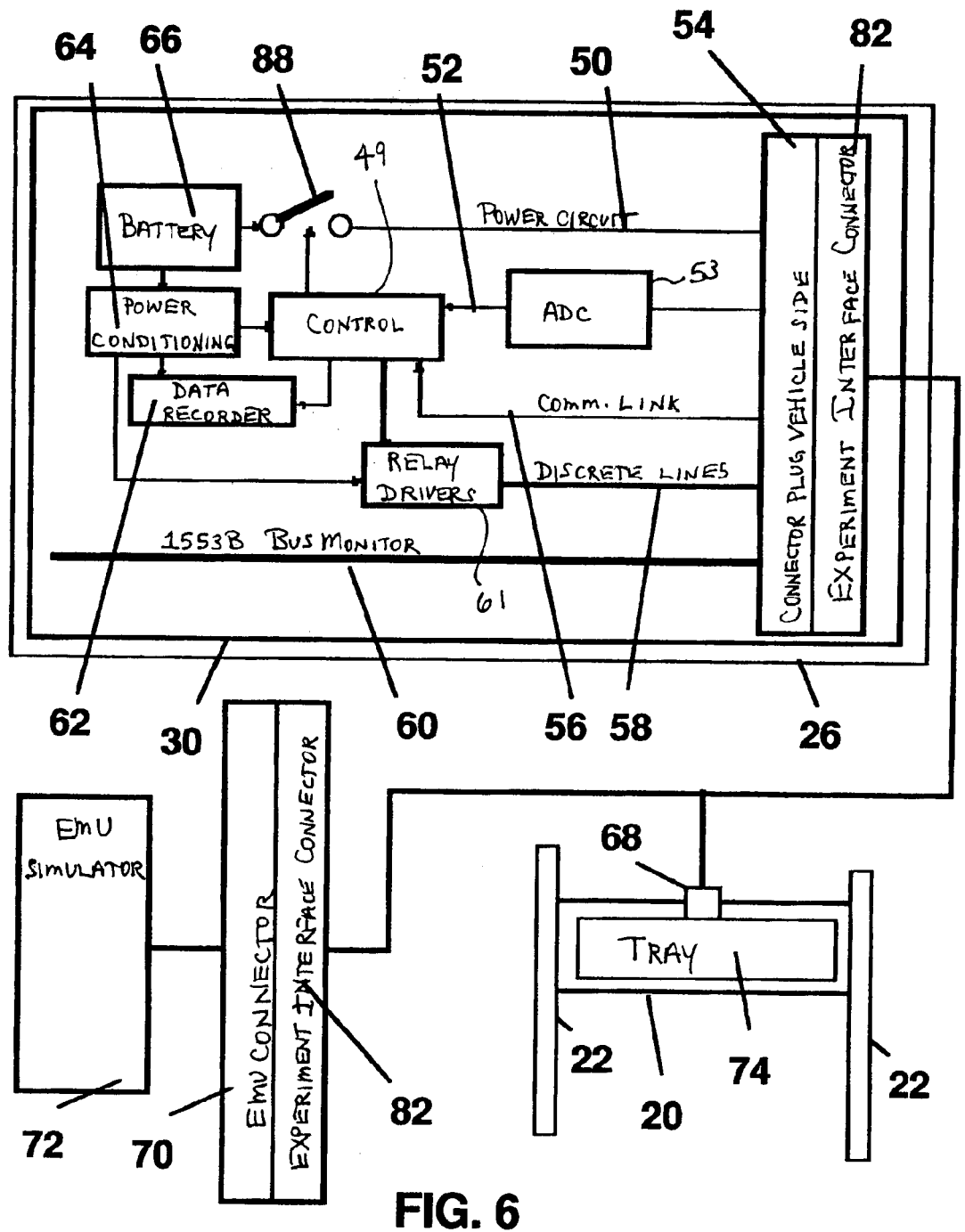
FIG. 6 illustrates the experiment management unit.

FIG. 6 depicts the EMU 30 attached to space launch vehicle 26 and to the EMU simulator 72. While this hookup is not likely in actual use, the figure is helpful in defining the actual and simulated conditions of EMU 30. The EMU 30 serves as the interface between various ECOBOX 20 with experiment (ECOBOX) tray 74 and space launch vehicle 26 to support services available from the OV stage 34 including power, communications, the 1553B data bus, control and other services including transportation.

Actual avionics flight data from the space launch vehicle 26 is available via the 1553B data bus monitoring 60 through the connection of a 55 pin electrical connector vehicle side 54 to a mating 55 pin electrical interface connector tray side connector 68 (see FIG. 7) in the ECOBOX 20 for the actual flight of the experiment or through a mating 55 pin electrical interface connector EMU simulator side connector 70 for testing and simulation of the experiment before launch. Both 55 pin electrical interface connector EMU simulator side connector 70 and 55 pin electrical connector vehicle side connector 54 interface with the same 55 pin electrical interface connector experiment side 82.

Communications data from the space launch vehicle 26 is available via an RS-422 communications link 56 through the connection of 55 pin electrical connector plug vehicle side 54 to connector tray side connector 68 in ECOBOX 20 for the actual flight of the experiment or through EMU simulator side connector 70 for testing and simulation of the experiment before launch.

Discrete communications data or separate status information from the space launch vehicle 26 is available via discrete commands in 5 standard wires 58 through the connection of 55 pin electrical connector plug vehicle side 54 to the tray side connector 68 in the ECOBOX 20 for the actual flight of the experiment or through the EMU simulator side connector 70 for testing and simulation of the experiment before launch or in the customer's lab.

Data recording to and from the space launch vehicle 26 is available via data recorder 62 through analog in 8 standard wires 52 via the connection of 55 pin electrical connector plug vehicle side 54 to the connector tray side connector 68 in the ECOBOX 20 for the actual flight of the experiment or through the EMU simulator side connector 70 for testing and simulation of the experiment before launch.

Power from the space launch vehicle 26 is available via power conditioning 64 from an experiment battery 66 in the EMU 30 attached. The side connector 68 on the EMU 30 near the ECOBOX 20 shown with experiment support structure 22 for the actual flight of the experiment on the space launch vehicle 26 or through the EMU simulator 55 pin electrical connector plug experiment side 82 for testing and simulation of the experiment before launch. A power inhibit circuit 88 further provides control to turn power on and off in 28 volt 2 standard wires 50 power circuit.

The EMU 30 may include conventional components such as an analog to digital converter (ADC) 53, a digital to analog converter (not shown) and relay drivers 61 to control the discrete lines, and the like. The operation of these components is well known in the art and need not be described herein. The EMU 30 is controlled by a control system 49, to provide the necessary timing for experiments, power control, signal buffering data storage and the like. The control system 49 may be a microprocessor, digital signal processor, microcontroller, programmable gate array, discrete component circuit or the like.

FIG. 7A illustrates the experiment tray 74 coupled to the space launch vehicle 26, as shown in FIG. 7B or coupled to the simulator 72, shown in FIG. 7C. The EMU simulator side connector 70 provides the same discrete, or separate signal or status message of communications data, power, power conditioning, data recording, data compression, and other services simulated from space launch vehicle 26 to various ECOBOX 20 units being tested prior to launch.

FIG. 7A also depicts an experiment (ECOBOX) tray 74 as the standard for customer interface and use. The ECOBOX tray 74 contains holes 76 to save weight. The ECOBOX tray 74 also includes bolt down holes 78 for customer attachment purposes, ECOBOX attachment brackets 92 and the tray side connector 68.

In FIG. 7B, EMU 30 with 55 pin electrical interface connector plug vehicle side 54 uses the launch vehicle side connector 82 to connect to the ECOBOX tray 74 for the transportation to orbit and operation in orbit on space launch vehicle 26. EMU 30 is attached to space launch vehicle 26 (not shown) and can derive data from the avionics on-board the OV stage 34.

In FIG. 7C, EMU 30 with 55 pin electrical interface connector EMU simulator side 70 uses the launch vehicle side connector 82 to connect to the ECOBOX tray 74 for the simulation of transportation to orbit and operation in orbit using EMU simulator software 94. The EMU 30 is attached to space launch vehicle 26 and can derive data from the avionics on-board the OV stage 34.

The EMU simulator 72 uses the EMU simulator side connector 70 to connect the EMU simulator 72 and ECOBOX tray 74 with EMU simulator software 94. The EMU simulator software 94 can simulate the entire flight profile and permit the experimenter to simulate the entire experiment in the laboratory well before flight time. In a conventional approach, experimenters must be present at the launch site to conduct simulation operations as the experiment is placed in the space vehicle. Long lead times are typically required when placing an experiment in a conventional space vehicle.

In contrast, the EMU simulation software 94 permits testing in the laboratory and provides an opportunity to modify the experiment up to a point much closer to launch time than conventional space vehicles. Testing in the laboratory greatly reduces the cost of the experiment by eliminating the need to be present at the launch site for an extended period of time. Indeed, experimenters can simulate the experiment and deliver the ECOBOX tray 74 for placement in the ECOBOX 20 without even having to visit the launch site.

FIG. 7A depicts mid-deck locker size experiment 84 positioned over experiment (ECOBOX) tray 74 with 55 pin electrical interface connector tray side 68 using bolt down holes 78 for attachment and holes 76 to save weight for cost reduction.

Figure 8:
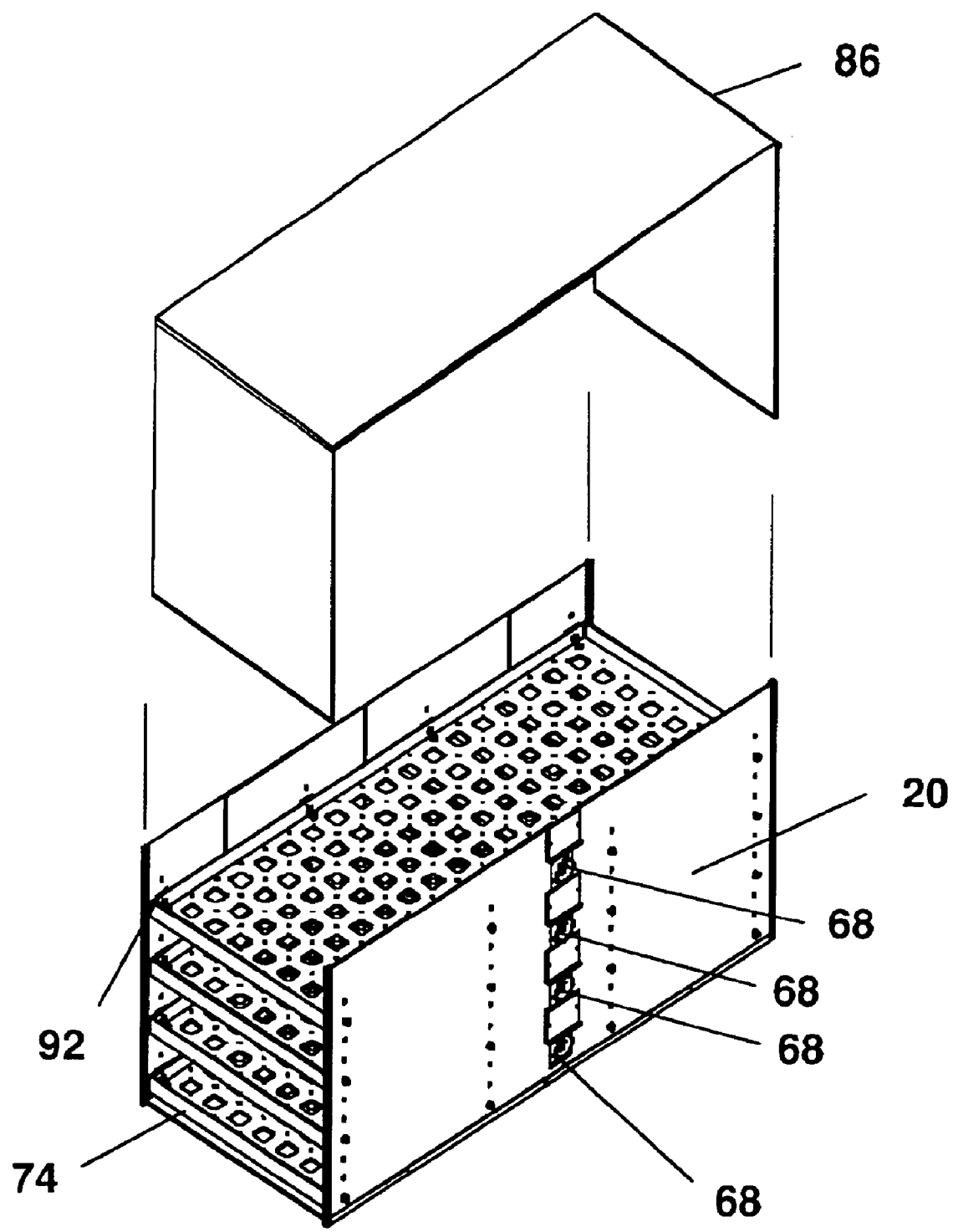
FIG. 8 illustrates several trays in the covered experiment volume.

In FIG. 8 ECOBOX attachment brackets 92 attach each ECOBOX tray 74 to the ECOBOX 20. Each ECOBOX tray 74 includes its own tray side connector 68 remain capable of connection with Experiment (ECOBOX) top 86 or cover providing a closed experiment container.

The following section provides structural, electrical and mechanical information about the ECOBOX 20 and the ECOBOX trays 74. The use of standardized components and predetermined structural, electrical and mechanical characteristics permit uniformity in the operation of the ECO-BOXes 20. However, the types of experiments carried in the ECOBOXes can have great variety and have few limitations.

Secondary Payload Hardware

Internally Mounted Experiment Accommodations

Kistler can place experiments inside the K-1 vehicle to demonstrate the operation of mechanical and electronics technologies in an actual launch, orbital, and reentry environment. These experiments will be mounted on Kistler supplied-trays in a Kistler-supplied Experiment Containment Box (ECOBOX), which can also be used for microgravity science experiments. ECOBOXes can be placed in the OV Forward Skirt 32, OV Mid-Body 36, and OV Aft Flare 38, as illustrated in FIG. 2–5. ECOBOXes 20 are designed to provide a standard mechanical and electrical interface for a wide variety of experiments. The boxes electrically isolate the experiment from K-1 space vehicle 26, and protect the K-1 from damage if a part breaks off the experiment (and vice versa). Experiment Management Unit (EMU) 30 (see FIGS. 1 and 6) on space vehicle 26 provides each experiment in an ECOBOX 20 with 28 VDC power, data recording for analog sensors, digital data recording through an RS-422 interface, TTL-compatible discrete digital control signals, and access to the K-1, 1553B avionics data bus in shadow mode.

Well in advance of launch, Kistler delivers each experimenter an Interface Kit containing the requisite number of Experiment Trays (i.e., ECOBOX tray 74), fasteners, electrical connectors, and an EMU simulator 72 to verify the electrical interfaces. ECOBOX tray 74 contains a standard bolt pattern to mount experiments. Prior to launch, the experimenters deliver their experiments mounted on ECO-BOX tray 74 to Kistler. Kistler, in turn, installs the trays into ECOBOXes and mounts them onto the K-1 space vehicle 26. Multiple experiments from different customers may be placed in the same ECOBOX 20, or experiments may be separated into different ECOBOXes, depending on compatibility issues. After the flight, Kistler returns the experiments and trays to the experimenters, and delivers a Post-Flight Report documenting flight results.

If required, processing areas, office space, and storage areas at the launch site for the experimenter are available to support pre-launch checkout and testing.

Structural And Mechanical Interfaces

Three locations are available to mount Active Experiments inside K-1 Orbital Vehicle (OV) stage 34. These locations are in the OV Forward Skirt 32, OV Mid-Body 36, and OV Aft Flare 38, as shown in FIG. 2. All of these three locations are easily accessible during vehicle processing up until stage mate. Two or three ECOBOXes 20 can be mounted at each of the three locations for protecting, mounting, and interfacing with standard flight experiments. The Kistler-supplied ECOBOXes are shock-mounted to the K-1 vehicle structure. Experimenters integrate their experiments onto the standard ECOBOX trays 74 provided by Kistler. Kistler will take the experiments integrated on these trays and install them in the appropriate ECOBOX on the K-1 vehicle.

The OV Forward Skirt 32 and OV Aft Flare 38 mounting locations can each carry two ECOBOXes 20. The OV Mid Body mounting location 36 can carry three ECOBOXes 20. The actual mounting location used for each experiment and each ECOBOX is determined based on experimenter requirements.

Structural Stiffness and Loads

The design limit load factors for experiments internally mounted to the OV with a mass less than 100 pounds mass (lbm). The load factor for experiments greater than 100 lbm is 11.25 g. The load factors apply to all axes (one at a time), and encompass both combined static and dynamic loads.

Hardware provided by the experimenter shall be designed to meet the design load factors with an ultimate factor of safety of at least 1.50. There is no requirement for yield factor of safety.

ECOBOX hardware, including OV mounting structure and internal trays, will be designed to the design load factors for experiments with the mass property limits. All ECOBOX hardware is designed with an ultimate factor of safety of at least 1.50.

There is no requirement for experiment stiffness. Kistler will design all ECOBOX hardware to the required stiffness levels when carrying experiments with the mass property limits.

Technical Description—Experiment Envelope

Static Envelope

The static envelope refers to the package outline (i.e., the volume occupied by experiments) when the space vehicle 26 is motionless before launch. Each ECOBOX has a total interior static envelope of 14.750"×35.750"×15.875" (X×Y×Z directions). Each ECOBOX 20 can carry up to four stacked ECOBOX trays 74, as illustrated in FIG. 8. Experimenters can use a single tray or multiple trays. With four trays installed and an equal envelope apportioned to each tray, the static envelope of experiment hardware on a tray shall not exceed 14.250"×35.250×3.000". The static envelope of experiment hardware on a tray can exceed 3.000" height (Z-direction) if less than four trays are installed in the ECOBOX or if one or more trays are given a larger envelope than other trays. However, the experiment static envelope on any single tray shall not exceed 14.250"×35.250"×15.375". The static envelope shall also not impinge on the eight ECOBOX attachment brackets and bolts or the wall mounted electrical receptacle connector.

Dynamic Envelope

The dynamic envelope refers to the package outline (i.e., the volume occupied by experiments) when the space vehicle 26 is in motion. Those skilled in the art will recognize that there is considerable vibration during the launch. Each ECOBOX 20 has a total interior dynamic dimensions of 15.000"×36.000"×16.125" (X×Y×Z directions) and a volume of 5.0 ft3, approximately equal to 2.5 Middeck Locker equivalents. The following mass properties apply to the experiment. The weight of Kistler-supplied interface hardware (including ECOBOXes, trays, fasteners, and electrical connectors) are not included in these requirements. Each ECOBOX can carry up to four stacked experiment trays. Experimenters can use a single tray or multiple trays. With four trays installed, the dynamic envelope of experiment hardware on a tray cannot exceed 14.500"×35.500"×3.125". The dynamic envelope of experiment hardware on a tray can exceed 3.125" height if less than four trays are installed in the ECOBOX; however, the maximum experiment dynamic envelope on any single tray is 14.500"×35.500"×15.500".

Mass Properties

The following mass properties apply to the experiment. The weight of Kistler-supplied interface hardware (including ECOBOXes, trays, fasteners, and electrical connectors) are not included in these requirements:

The mass of experiments mounted on any single tray shall not exceed 50 lbm.

The total mass of each experiment mounted on any number of trays shall not exceed 120 lbm.

The experiment center of gravity shall have a y-coordinate between 16.0 and 20.0 inches, and an x-coordinate between 6.5 and 8.5 inches.

Pressure Tubing/Pressure Vessels

Pressure vessels shall be designed with an ultimate factor of safety of 4.0. That is, the pressure vessel is designed to withstand 4.0times the expected pressure. All fluid and gas lines shall be designed with an ultimate factor of safety of 2.0 or greater. All lines shall be clamped every 18 inches or less.

Coefficient of Thermal Expansion

The experiment shall match the ECOBOX experiment tray coefficient of thermal expansion ($13.5 \times 10-6$ in/in/° F.) sufficiently to limit thermally induced stress in the tray to 10,000 psi at a worst-case temperature of 120° F.

Galvanic Corrosion Mitigation

If the experiment consists of any composite material, the experiment shall place a fiberglass spacer or equivalent insulator between the aluminum experiment tray surface and the experiment.

Thermal Conductance

The experiment shall have an average thermal conductance of at least 30 BTU/hr/ft2/° F. over the area of physical contact between the experiment and the ECOBOX experiment tray surface to ensure adequate heat rejection across the interface.

Location and Installation Details

Kistler will supply the experimenter with a Mechanical Interface Kit containing the requisite number of trays, fasteners, and electrical connectors by L-5 months (i.e., 5 months prior to launch) before the scheduled flight. The contents of the Mechanical Interface Kit will be formalized in an interface control document (ICD). An ICD is a document, known in the art, used to define interconnectivity and integration of separate components that will operate together. The ICD may include electrical and mechanical specifications. The standard aluminum (alloy 6061-T6) trays contain a pattern of 0.1875" (3/16") bolt-down holes spaced 2.000" apart starting at 0.375" from the edge of the tray, for a total of 136 bolt-down holes per tray. Experimenters will build their experiments on boards with pass-through holes to fasten to the trays at these bolt-down hole locations. Kistler will supply alloy-steel button head socket bolts (8–32×0.5") and accompanying washers and nuts, which shall be secured by the experimenter with a minimum torque of 20.0 lbf-in. Eight of these bolt-down hole locations along the perimeter of the tray are reserved for Kistler use to fasten the tray onto brackets in the ECOBOXes.

Each tray contains a pattern of 1.000" square cut-outs to save weight. If the experiment utilizes multiple stacked trays, these cut-outs can be used to pass wiring between trays. Experimenters can also bond wiring and tube clamps directly to the tray surface.

After installation of the experiment onto the tray(s), the trays can be used for functional and environmental testing, including random vibration testing. When the experiment is ready for flight, experimenters will pack the trays for shipment to Kistler's designated U.S. receiving site.

Mechanical Interface Drawing

An integrated ECOBOX 20 contains four experiment trays (i.e., the ECOBOX trays 74). The configuration of the four experiment trays inside the ECOBOX with its top cover removed is illustrated in FIG. 8. On a single experiment tray with support brackets attached, as delivered in the Mechanical Interface Kit provided to experimenters. A dimensional drawing of an experiment tray, including a section cut drawing.

Electrical Interface

This section defines the standard electrical interfaces between the K-1 vehicle and standard active flight experiments. Standard active flight experiments may interface with the EMU 30, which is installed in the K-1 vehicle. The EMU 30 provides power, data recording (analog-to-digital and digital), discrete command, power switching, and 1553B bus monitoring functions. The programmable EMU 30 utilizes a PowerPC 603e processor and a VxWorks real-time operating system.

Kistler will deliver the experimenter the EMU simulator 72 (see FIG. 7) at L-5 months. The EMU simulator 70 mimics all physical and functional interfaces of the EMU 30. It will include a launch vehicle electrical interface plug and experiment-specific software to verify power, command discrete, 1553B avionics bus, and data recording interfaces. The EMU simulator 72 will have a pre-loaded Mission Timeline, so the experimenter can simulate a full mission sequence. The experimenter will return the EMU simulator 72 at the time of experiment delivery in the U.S. by L-1 month. An EMU simulator 72 will be available at the launch site for final test and checkout.

Connectors and Pin Assignments

Kistler will provide one 55-pin electrical harness to connect the experiment with the EMU 30. Kistler provides one 55-pin plug, part number MS27467T23F55P, to connect each flight experiment with the EMU 30. On the experiment side of the interface, Kistler will provide the experimenter a 55-pin receptacle connector (i.e., the tray side connector 68 in the ECOBOX 20), part number MS27466T23F55P, with a potting backshell for shield termination. This receptacle will be mounted on one of the ECOBOX experiment trays provided to the experimenter. In the ICD, experimenters will state which pins are used and which are unused.

Power Interfaces

The K-1 will provide experiments installed in ECO-BOXes with two 28±3 VDC power circuits. The maximum current draw shall not exceed 5.0 amps on each circuit. The total peak power draw (both circuits combined) shall not exceed 280 watts at any time. To minimize heat rejection from the experiment during potentially high ambient temperatures, the experiment shall not draw more than 25 watts (both circuits combined) at any time between rollout of the K-1 from the Vehicle Processing Facility and lift-off. The EMU uses a 100 amp-hr battery to supply power to all experiments. Experiments shall use a maximum of 25 amp-hrs unless otherwise required and stated in the ICD. As noted above, the ICD provides detailed specifications of electrical and/or mechanical system components to permit the components to operate together satisfactorily. Power can be switched by the EMU 30 under software control based on the Mission Timeline provided by the experimenter. The EMU 30 uses the power inhibit circuit 88 to control power to the ECOBOX tray 74.

Grounding/Isolation

Internal components of the experiment shall tie their signal grounds together onto the tray structure. Kistler will connect experiment tray grounds to the K-1 vehicle single point electrical ground.

The EMU is electrically isolated from other K-1 vehicle systems. There is no requirement for fusing or surge current on the experiment.

Bonding

Electrical bonding of the experiment to the K-1 is accomplished by physical contact of the experiment single point ground to the experiment tray. The electrical resistance of this bond shall be 0.010 ohms or less, and will be re-verified during integration operations.

1553B Bus Monitoring Interface

If required, the EMU can provide the experiment access to the MIL-STD-1553B K-1 avionics bus in monitoring mode only. The 1553B interface is a transformer-coupled, long-stub configuration. The EMU supports standard Built-in-Test (BIT) functions in a manner that assures the integrity of all received messages. The EMU's software will control the data received by the experiment such that only 1553B traffic of interest will be transmitted across the interface.

The K-1 vehicle exchanges a large amount of information over the 1553B avionics bus, including propulsion system sensor data, vehicle navigation sensor data, system time, command events to pyros and actuators, and all other information exchanged between avionics equipment in the K-1 OV. The full list of subaddresses is too extensive to include in this document. A Detailed Experiment Questionnaire will ask experimenters to list the types of K-1 vehicle management data of interest to the experiment. Kistler will match these requests to specific subaddresses already in the K-1 avionics system design. Kistler will then document the bit-specific definition of this information in the experiment ICD in accordance with MIL-STD-1553B.

Using the EMU simulator 72 provided by Kistler, the experimenter shall verify the experiment meets its functional requirements when connected to a 1553B interface specified in the ICD.

Data Recording Interface

The EMU provides each experiment with up to eight 0–10 VDC analog-to-digital conversion channels to record data from sensors.

Conversion Time 50 microseconds maximum

Absolute Accuracy 0.1% full-scale (RMS)

Minimum resolution for no missing codes 11 bits minimum

The EMU 30 implements first-order low-pass filters on all analog inputs.

The EMU 30 also accepts one RS-422 serial signal from each experiment (capable of transferring 1.0 Mb/second) that can be used for digital data recording.

Up to 1,500 Mb of flash data recording memory are available in the EMU for all flight experiments at a rate of 10 Mbps. Of this amount, each experimenter should expect an allocation of up to 375 Mb, unless otherwise required and stated in the ICD. As an optional service, the total EMU memory storage is expandable to 4,500 Mb.

The Detailed Questionnaire will ask the experimenters to specify the types and number of sensors the K-1 will record data from, including required sample rates, sampling times, excitation voltage, units, sensor range, and minimum and maximum expected values. Based on these responses, Kistler will document the detailed interface for data recording in the ICD, which will conform with existing K-1 EMU capabilities. Using the EMU simulator provided by Kistler, the experimenter shall verify the experiment meets its functional requirements when connected to the data recording interface specified in the ICD.

Command Interfaces

The EMU provides each experiment up to four controlled discrete output voltages at +28 VDC at 2.0 Amp maximum. The EMU can set and reset discretes in any combination. The EMU can also perform BIT on discretes during check-out procedures (after installation on the K-1) to determine the experiment's ability to be commanded.

The Detailed Experiment Questionnaire will ask experimenters to provide a Mission Timeline. One of the functions of this Timeline will be to specify the timing and voltage level of command discretes the EMU will provide to the experiment.

Using the EMU simulator provided by Kistler, the experimenter shall verify the experiment meets its functional requirements when connected to a command interface with this specification.

EMI/EMC

The experimenter shall provide EMI control, in the form of wire twisting, shielding, and separation in accordance with MIL-STD-461. The ECOBOX itself is expected to provide significant attenuation of any radiated emissions from the experiment. The experimenter will define the predicted electromagnetic emissions from the experiment in the Detailed Experiment Questionnaire. Based on this input, Kistler will assess potential EMI issues between the experiment and other experiments on the flight and the K-1 vehicle, applying a 6 dB safety margin.

Installation Details

Experimenters will also wire their experiments to the single 55-pin receptacle connector supplied by Kistler. The perimeter wall around the tray contains a single hole for pass through of this connector. Kistler will deliver one tray to each experimenter with the electrical receptacle connector pre-mounted, and additional trays as needed without an electrical connector. After installation of the trays into ECOBOXes, the receptacle connector will pass through a hole in the side of the ECOBOX. During installation of the ECOBOXes into the K-1 vehicle, Kistler will connect the 55-pin plug connector running from the EMU on an electrical harness into this receptacle connector.

The Mechanical Interface Kit delivered to the experimenter by Kistler at L-5 months will contain detailed instructions for wiring the experiment into the connector, including requisite tools and techniques for crimping and contact insertion.

Environmental Interfaces

This section describes the predicted environments experienced by active flight experiments on the K-1 vehicle during both ground and flight phases resulting from sources exterior to the ECOBOX. Experiment operations within the ECOBOX may effect the actual flight environment (e.g., the thermal environment may be effected by operation of experiment electronics).

Thermal

Experiments shall satisfy their performance requirements after extended exposure to temperatures between −15° F. and 120° F. For ECOBOX configurations with high power draw during mission phases with high ambient temperatures, Kistler may require the experimenters to perform a thermal analysis to verify adequate heat rejection, or to submit a thermal model for Kistler to perform a thermal analysis. If required, this will be documented in the ICD.

Humidity

The experiment shall satisfy its performance requirements after extended exposure to a relative humidity 0–60%, non-condensing, through the temperature range specified.

Contamination

Kistler can provide the experimenter with a Class 8 clean environment per ISO 14644-1 to process experiments. Kistler can also integrate experiments into ECOBOXes in a ISO Class 8 environment. Surfaces within Kistler clean areas are cleaned to Level 750B particulate per MIL-STD-1246. Unless the ECOBOX is pressurized (an optional service) the experiment will be exposed to the ambient air environment of the Woomera launch site once integrated into the vehicle in the K-1 Vehicle Processing Facility (VPF). Ambient air will be able to diffuse into the ECOBOX through its vent holes.

Pressure

ECOBOXes are unpressurized containers. The experiment shall satisfy its performance requirements after exposure to an ambient pressure ranging from sea level through 300,000 feet. During ascent, experiments in ECOBOXes may undergo rapid depressurization. At stage separation, a positive pressure in the Interstage forces the stages apart (approximately 139 seconds after liftoff). After this event, the pressure in the Interstage and all adjacent cavities, including the OV Mid Body and OV Aft Flare, drops rapidly. The experiment shall satisfy its performance requirements after exposure to rapid depressurization from 7 psi to 0.02 psi in 0.4 seconds. Kistler can provide experiments with a pressurized ECOBOX as an optional service.

Microgravity Environment

During its coast phase, the OV experiences a prolonged microgravity environment. This environment may be interrupted for a time to perform a period-adjustment burn with the OMS engine. Table 4 describes the timing, duration, and quality of the expected OV microgravity environment, assuming a clean-up burn is necessary. Kistler can provide vibration isolation at the vehicle/ECOBOX interface to improve microgravity quality as an optional service.

| OV Microgravity Environment | | |
| --- | --- | --- |
| Event Start (from start of LAP Main Engines) | Approximate Duration | Microgravity Quality (g) |
| +02:52:12 | 14.5 hours | <10−5 |
| +17:40:35 | 5 hours | <10−5 |

Operations Interface

This section is primarily reserved for experimenter input on the procedures required to integrate their standard active flight experiments with the K-1 vehicle at the launch site.

Installation Procedure

Kistler will deliver packaged experiment trays to the Woomera launch site. After unpacking the trays in Woomera, Kistler will deliver the trays to experimenter personnel (if present at the launch site) for final test and checkout of the experiment. If experimenter personnel are not present for the flight, Kistler can perform final test and checkout. If required, ISO Class 8 clean facilities can be provided for unpacking, test, and checkout. An EMU simulator is available for use by the experimenter.

INDUSTRIAL APPLICABILITY

The invention is further illustrated by the following non-limiting examples.

EXAMPLE 1

Mid-Deck Locker Test Quick in Microgravity

A 2 cubic foot standard experiment container is placed aboard the launch vehicle and supplied communications and electrical power to use effectively the 22 hours of microgravity as a secondary payload within the launch vehicle mission timeline in orbit. The 22 hours of "quiet" undisturbed microgravity is used to test the experiment hardware to determine the suitability for longer duration flights to orbit.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. For example, electrical connections between the EMU 30 and experiment trays 74 could be at least partially replaced by fiber-optic cable. The entire disclosures of all references, applications, patents, and publications cited above are hereby incorporated by reference.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for introducing payloads into earth orbit, comprising:

an orbital vehicle capable of being placed in earth orbit, the orbital vehicle having a rounded outer skin to define an interior portion;

a vehicle monitor system providing data related to the operation of the orbital vehicle;

a plurality of attachment positions located within the interior portion of the orbital vehicle; and a first experimental container affixed to the orbital vehicle at a first one of the plurality of attachment positions, the first experimental container being coupled to the vehicle monitor system to receive data therefrom, the data being used by experimental devices contained within the first experimental container.

2. The system of claim 1, further comprising a second experimental container affixed to the orbital vehicle at a second one of the plurality of attachment positions, the second experimental container being coupled to the vehicle monitor system to receive control data therefrom, the control data being used by experimental devices contained within the second experimental container.

3. The system of claim 2 wherein the first and second experimental containers have uniform predetermined dimensions, the first and second ones of the plurality of attachment positions being configured to receive and retain the first and second experimental containers at the first and second ones of the plurality of attachment positions.

4. The system of claim 1 wherein the orbital vehicle has an elongated shape with first and second ends with a rocket engine positioned proximate the second end of the orbital vehicle, a first of the plurality of attachment positions being in the interior portion of the orbital vehicle proximate the first end.

5. The system of claim 4 wherein experimental containers attached at the first of the plurality of attachment positions being in the interior portion of the orbital vehicle and shielded from a space environment.

6. The system of claim 1 wherein the orbital vehicle has an elongated shape with first and second ends with a rocket engine positioned proximate the second end of the orbital vehicle, a first of the plurality of attachment positions being in the interior portion of the orbital vehicle intermediate the first and second ends.

7. The system of claim 6 wherein experimental containers attached at the first of the plurality of attachment positions being in the interior portion of the orbital vehicle and shielded from a space environment.

8. The system of claim 1 wherein the orbital vehicle has an elongated shape with first and second ends with a rocket engine positioned proximate the second end of the orbital vehicle, a first of the plurality of attachment positions being in the interior portion of the orbital vehicle proximate the second end.

9. The system of claim 8 wherein experimental containers attached at the first of the plurality of attachment positions being in the interior portion of the orbital vehicle and exposed to a space environment.

10. The system of claim 1, further comprising an experiment management unit electrically coupled to the orbital vehicle and electrically coupled to the first experimental container, the experiment management unit monitoring operation of the orbital vehicle and providing the vehicle monitor system data to the first experimental container.

11. The system of claim 1 wherein the vehicle monitor system utilizes an avionics data bus and monitors operation of the orbital vehicle by monitoring the avionics data bus.

12. The system of claim 1, further comprising an experiment management unit electrically coupled to the orbital vehicle and electrically coupled to the first experimental container, the experiment management unit providing electrical power to the first experimental container.

13. The system of claim 1 wherein the vehicle monitor system data includes a discrete data control signal, the discrete data control signal being coupled to the first experimental container and used for controlling operation thereof.

14. The system of claim 1 wherein the first experimental container comprises a plurality of experimental trays.

15. The system of claim 1 wherein the first experimental container comprises a plurality of experimental trays, the system further comprising an experiment management unit electrically coupled to the orbital vehicle and electrically coupled to each of the plurality of experimental trays in the first experimental container, the experiment management unit monitoring operation of the orbital vehicle and providing the vehicle monitor system data to each of the plurality of experimental trays in the first experimental container.

16. The system of claim 1 wherein the first experimental container comprises a plurality of experimental trays, the system further comprising an experiment management unit electrically coupled to the orbital vehicle and electrically coupled to each of the plurality of experimental trays in the first experimental container, the experiment management unit providing electrical power to each of the plurality of experimental trays in the first experimental container.

17. The system of claim 1, further comprising an experiment management unit simulator, the experiment management unit simulator configured for operation with program instructions to simulate operation of the orbital vehicle during a mission.

18. The system of claim 17 wherein the experiment management unit simulator is configured for operation at a location remote from the orbital vehicle and requires no interaction with the orbital vehicle.

19. The system of claim 1, further comprising an initial stage coupled to the orbital vehicle to boost the orbital vehicle from a position on earth to a predetermined altitude.

20. A method for introducing payloads into earth orbit using an orbital vehicle capable of being placed in earth orbit, the method comprising:
attaching a first experimental container to a first one of a plurality of attachment positions located within an interior portion of the orbital vehicle;
electrically coupling the first experimental container to a vehicle monitor system that provides data related to the operation of the orbital vehicle;
during the mission, receiving data from the vehicle monitor system in the first experimental container; and
using the data in experimental devices contained within the first experimental container.

21. The method of claim 20, further comprising:
attaching a second experimental container to the orbital vehicle at a second one of the plurality of attachment positions;
electrically coupling the second experimental container to the vehicle monitor system;
during the mission, receiving data from the vehicle monitor system in the second experimental container, and
using the data in experimental devices contained within the second experimental container.

22. The method of claim 20 wherein the orbital vehicle has an elongated shape with first and second ends with a rocket engine positioned proximate the second end of the orbital vehicle, and attaching the first experimental container to the first attachment position comprises attaching the first experimental container to an interior portion of the orbital vehicle proximate the first end.

23. The method of claim 22 wherein experimental containers attached at the first of the plurality of attachment positions are in the interior portion of the orbital vehicle and shielded from a space environment.

24. The method of claim 20 wherein the orbital vehicle has an elongated shape with first and second ends with a rocket engine positioned proximate the second end of the orbital vehicle, and attaching the first experimental container to the first attachment position comprises attaching the first experimental container to an interior portion of the orbital vehicle intermediate the first and second ends.

25. The method of claim 24 wherein experimental containers attached at the first of the plurality of attachment positions being in the interior portion of the orbital vehicle and shielded from a space environment.

26. The method of claim 20 wherein the orbital vehicle has an elongated shape with first and second ends with a rocket engine positioned proximate the second end of the orbital vehicle, and attaching the first experimental container to the first attachment position comprises attaching the first experimental container to an interior portion of the orbital vehicle proximate the second end.

27. The method of claim 26 wherein experimental containers attached at the first of the plurality of attachment positions being in the interior portion of the orbital vehicle and exposed to a space environment.

28. The method of claim 20, further comprising electrically coupling an experiment management unit to the orbital vehicle and electrically coupling an experiment management unit to the first experimental container, and monitoring operation of the orbital vehicle with the experiment management unit and providing the vehicle monitor system data to the first experimental container.

29. The method of claim 20, further comprising providing electrical power to the first experimental container using an experiment management unit electrically coupled to the first experimental container.

30. The method of claim 20 wherein providing data related to the operation of the orbital vehicle with the vehicle monitor system comprises by monitoring an avionics data bus.

31. The method of claim 20 wherein receiving data from the vehicle monitor system in the first experimental container includes receiving a discrete data control signal, the discrete data control signal being coupled to the first experimental container to control operation thereof.

32. The method of claim 20 wherein the first experimental container comprises a plurality of experimental trays.

33. The method of claim 20 wherein the first experimental container comprises a plurality of experimental trays, the method further comprising electrically coupling an experiment management to the orbital vehicle and to each of the plurality of experimental trays in the first experimental container, the experiment management unit monitoring operation of the orbital vehicle and providing the vehicle monitor system data to each of the plurality of experimental trays in the first experimental container.

34. The method of claim 20 wherein the first experimental container comprises a plurality of experimental trays, the method further comprising electrically coupling an experiment management unit to the orbital vehicle and to each of the plurality of experimental trays in the first experimental container, the experiment management unit providing electrical power to each of the plurality of experimental trays in the first experimental container.

35. The method of claim 20, further comprising configuring an experiment management unit simulator for operation with program instructions to simulate operation of the orbital vehicle during a mission.

36. The method of claim 35 wherein the experiment management unit simulator is configured for operation at a location remote from the orbital vehicle and requires no interaction with the orbital vehicle.

37. A method for introducing payloads into earth orbit using an orbital vehicle capable of being placed in earth orbit having an experiment management unit associated therewith, the experiment management unit being coupled to an avionics data bus on the orbital vehicle to derive orbital vehicle data therefrom, the method comprising:

preparing an experiment tray at a location remote the a launch site for the orbital vehicle, the experiment tray having predetermined dimensions, the experiment tray having an interface connection to permit electrical coupling to the experiment management unit, the experiment tray deriving electrical power and orbital vehicle data from the experiment management unit;

configuring an experimental management unit simulator for operation with program instructions to simulate operation of the orbital vehicle during a mission, the experimental management unit simulator having an interface connector compatible with the experiment management unit;

upon completion of the experiment tray, coupling the interface connection to the experiment management unit simulator; and simulating operation of the orbital vehicle during the mission to thereby test operation of the experiment tray.

38. The method of claim 37 wherein simulating operation of the orbital vehicle comprises the experiment management unit simulator generating data identical to data that would be generated by the orbital vehicle during the mission.

39. The method of claim 37 wherein simulating operation of the orbital vehicle comprises the experiment management unit simulator generating a discrete data control signal, the discrete data control signal being coupled to the experiment tray to control operation thereof.

40. The method of claim 37 wherein the experiment management unit simulator is configured for operation at a location remote from the orbital vehicle and requires no interaction with the orbital vehicle.

41. The method of claim 37, further comprising mounting the experiment tray in an experiment containment box for mounting on the orbital vehicle.

42. The method of claim 41 wherein the experiment tray is one of a plurality of experiment trays mounted in the experiment containment box.

* * * * *